United States Patent [19]

Hirakawa

[11] 4,225,642
[45] Sep. 30, 1980

[54] RAISED AND FUSED FABRIC FILTER AND PROCESS FOR PRODUCING THE SAME

[75] Inventor: Tadashi Hirakawa, Kusatsu, Japan

[73] Assignee: Teijin Limited, Osaka, Japan

[21] Appl. No.: 854,334

[22] Filed: Nov. 23, 1977

[30] Foreign Application Priority Data

Dec. 8, 1976 [JP] Japan .................................. 51-146554
Jan. 5, 1977 [JP] Japan ........................................ 52-65

[51] Int. Cl.² .............................................. D04H 1/04
[52] U.S. Cl. ......................................... 428/91; 156/82;
210/323 R; 210/323 T; 210/505; 210/510;
210/507; 428/198
[58] Field of Search ...................... 428/91, 85, 92, 198;
156/82; 210/323 R, 323 T, 505, 507, 510

[56] References Cited

U.S. PATENT DOCUMENTS

| | | | |
|---|---|---|---|
| 3,324,609 | 6/1967 | Stein | 156/82 |
| 3,855,046 | 12/1974 | Hansen | 428/198 |

Primary Examiner—Marion McCamish
Attorney, Agent, or Firm—Burgess, Ryan and Wayne

[57] ABSTRACT

A fabric filter having a low pressure drop, a high collection efficiency and an excellent cleanability is produced by raising one surface of a woven or knitted fabric comprising thermoplastic polymer fibers, to form a fibril layer containing therein the thermoplastic polymer fibrils, bringing the fibril layer into contact with a heating medium to form networks of fuse-bonded thermoplastic polymer fibrils on the fibril layer surface, and optionally, calendering the fabric.

12 Claims, 3 Drawing Figures

(×40)

(×40)

(×40)

(×40)

RAISED AND FUSED FABRIC FILTER AND PROCESS FOR PRODUCING THE SAME

The present invention relates to an improved fabric filter and a process for producing the same. More particularly, the present invention relates to an improved fabric filter having a high collection efficiency, a low pressure drop, and an excellent cleanability, and a process for producing the fabric filter.

The term "collection efficiency" used herein refers to a percentage of the amount by weight of solid particles which have been collected on a fabric filter by filtering a suspension, based on the entire amount by weight of the solid particles contained in the suspension.

The term "pressure drop" used herein refers to a difference between a pressure of a fluid to be filtered fed to a surface of a fabric filter and a pressure of the fluid after passing through the fabric filter. Usually, the pressure drop increases with the formation of a cake which is composed of solid particles collected on the fabric filter surface.

The term "cleanability" used herein refers to a degree of ease in removing the cake from the fabric surface, after the filtering operation is completed. In some fabrics, the cake is easily separated and removed from the fabric filter surface. However, in others, it is difficult to remove the cake from the fabric filter surface. If, after the cleaning operation, a portion of the cake remains, as a particulate residue in the fabric filter structure, and deposits in the holes of the fabric filter through which the filtrate passes, the repeat filtering operations result in an increase of the pressure drop of the fabric filter. A large increase of the pressure drop causes the fabric filter to be useless.

A conventional fabric filter is made of a non-woven fabric or a woven fabric. The woven fabric includes a filament yarn woven fabric, spun yarn woven fabric and union woven fabric. Generally, the filament yarn woven fabric filter is advantageous due to its excellent cleanability, but is disadvantageous due to its high pressure drop during the filtering operation and poor collecting efficiency. The spun yarn woven fabric filter has a high collection efficiency, but is disadvantageous due to its poor cleanability and high pressure drop. The non-woven fabric filter has a low pressure drop during the filtering process, but is disadvantageous because of its poor collecting efficiency and cleanability.

In order to enhance the collecting efficiency and reduce the pressure drop, an attempt was made to raise a surface of the conventional fabric filter in order to form a fibril layer thereon. This attempt was successful in increasing the collection efficiency and reducing the pressure drop during the initial cycles of filtration. However, the formation of the fibril layer results in removal of the collected cake from the fabric filter surface being very difficult. Accordingly, during a long filtering operation, the particulate residues accumulate in the fibril layer, resulting in the increase of the pressure drop with the lapse of time and, after a certain period, the pressure drop on the raised fabric filter becomes greater than that of a conventional non-raised fabric filter.

When a surface of the conventional non-woven fabric filter is singed or finished with a resinous finishing agent, the cleanability is somewhat enhanced. However, the enhanced cleanability of the singed or resin-finished non-woven fabric filter is still unsatisfactory for practical use. Particularly, in the case where the non-woven fabric filter is used for gas filtration, for example, a bag filter cloth from which the collected cake is removed by a low energy mechanical operation, for example, vibration, removal of the dust can not be carried out satisfactorily due to the stiffness of the non-woven fabric filter. Furthermore, the singeing of the non-woven fabric filter sometimes results in a deterioration of the cake cleanability.

The object of the present invention is to provide a fabric filter having a high collection efficiency, a low pressure drop during the filtering operation and an excellent cleanability and a process for producing the fabric filter.

The above-mentioned object can be attained by the fabric filter of the present invention which comprises a woven or knitted fabric comprising thermoplastic polymer fibers, and having a fibril layer which has been formed by raising a surface of said fabric and which is composed essentially of the thermoplastic polymer fibers, and which is characterized in that a portion of the fibrils in said fibril layer are fuse-bonded to each other to form networks of said fuse-bonded fibrils on the surface of said fibril layer.

The above-mentioned fabric filter can be produced by the process of the present invention which comprises raising a woven or knitted fabric comprising thermoplastic polymer fibers, to form a fibril layer composed essentially of the thermoplastic polymer fibers on a surface of said fabric, the process being characterized in that said fibril layer is brought into contact with a heating medium having a temperature higher than the melting point of said thermoplastic polymer fibers, to fuse-bond a portion of said fibrils to each other and to form networks of said fuse-bonded fibrils on the surface of said fibril layer.

The features and advantages of the present invention will be exemplified and more fully explained in the following description with reference to the accompanying drawings, in which.

Figure 1:
FIG. 1 is a scanning type electron microscopic view, in a magnification of 40, of a surface of a spun yarn woven fabric to be converted into a fabric filter of the present invention.

The woven or knitted fabric usable for the present invention contains thermoplastic polymer fibers which are converted to the fibrils in the fibril layer. The thermoplastic polymer fibers may consist of a polyester, for example, polyethylene terephthalate; an aliphatic polyamide, for example, nylon 6 or nylon 66; an aromatic polyamide, for example, poly(m-phenylene isophthalamide); a polyolefin, for example, polyethylene or polypropylene; polyvinyl chloride, or polyvinylidene chloride. The term "fiber", as used herein and in the appended claims, unless otherwise noted, includes staple form as well as continuous filament form.

The woven or knitted fabric may be a filament yarn woven or knitted fabric, spun yarn woven or knitted fabric or union woven or knitted fabric. The filament yarn woven or knitted fabric is composed of thermoplastic polymer filament yarns. The spun yarn woven or knitted fabric is composed of the thermoplastic polymer fiber spun yarns or spun yarns consisting of a blend of 40% by weight or more of thermoplastic polymer fibers and less than 40% by weight of natural fibers, for example, cotton or wool; regenerated fibers, for example, viscose rayon; or semisynthetic fibers, for example, secondary or tertiary cellulose acetate fibers. In the case of a woven fabric, it is preferable that its weft yarns consist of the thermoplastic polymer fibers. In this case, the warp yarns of the woven fabric may consist of the thermoplastic polymer fibers, fibers other than the thermoplastic polymer fibers or a blend of the thermoplastic polymer fibers and the fibers other than the thermoplastic polymer fibers. A woven fabric composed of warp yarns consisting of glass fibers and weft yarns consisting of the thermoplastic polymer fibers is one of the preferable fabrics usable for the present invention. This type of woven fabric has a high dimensional stability and is able to provide a fibril layer which is similar to that formed on a woven fabric in which both the warp and weft yarns consist of the thermoplastic polymer fibers.

The woven or knitted fabrics usable for the present invention are not limited to special structures of fabrics. However, satin and twill woven fabrics are preferable for the present invention, because the surface portion of these fabrics can be converted into a fibril layer having a proper fibril density. Especially, the satin woven fabric is most preferable for the present invention, because the satin woven fabric is easily raised to form the fibril layer and the resultant fibril layer has a high efficiency in collecting dust thereon.

The fibril layer is formed by raising a surface of the woven or knitted fabric. The raising method for the fabric is not limited to special methods. That is, the woven or knitted fabric can be raised by using any of the conventional raising machines, for example, a card wire raising machine, a teasel raising machine, or a carborundum raising machine.

In the fabric filter of the present invention, a portion of the thermoplastic polymer fibrils in the fibril layer are fuse-bonded to each other so as to form networks of the fuse-bonded fibrils on the surface of the fibril layer. The networks of the fuse-bonded fibrils are provided by bringing the fibril layer into contact with a heating medium having a temperature higher than the melting point of the thermoplastic polymer fibrils. The heating medium is not restricted to a special medium. However, usually, flames generated by burning a fuel, for example, gas or liquid fuel are used as the heating medium. In this case, the fabric is forwarded at a speed, for example, 50 to 150 m/minute, in such a manner that the fibril layer of the fabric is brought into contact with the flames for a very short time. This operation is similar to a conventional gas singeing operation, but lower in speed then the conventional operation at the same temperature of flame. Otherwise, the heating medium may be a heating plate or a heating pipe or drum having a temperature higher than the melting point of the thermoplastic polymer fibrils.

Referring to FIG. 1, the surface of the spun yarn woven fabric is uneven. However, referring to FIG. 2, after the surface of the spun yarn woven fabric is raised to form a fibril layer thereon, and then, the fibril layer is brought into contact with the heating medium having the above-specified temperature, the surface of the fibril layer is covered with the networks of the fuse-bonded fibrils 1 and, therefore, the surface of the fibril layer is relatively even. That is, the formation of the networks of the fuse-bonded fibrils on the fibril layer surface causes the fibril layer to have a relatively high smoothness and dimensional stability. The fibrils in the fibril layer are protected by the networks from slipping off from the fibril layer due to mechanical forces. Accordingly, the cake deposited on the fibril layer having the networks can be easily removed from the fibril layer surface, and the fabric filter having the fibril layer with the networks has an excellent collection efficiency and a low pressure drop during a long filtering operation.

It is preferable that the fibril layer formed on a surface of the woven or knitted fabric contains at least 10, more preferably, at least 50, nodes consisting of two or more fuse-bonded fibrils per $cm^2$ of the fibril layer surface.

The above-mentioned features of the fabric filter of the present invention result in the following advantages.

1. Even when the fabric filter is continuously used for a long time, there is substantially no blinding of the fabric filter.
2. The fabric filter can be continuously used for a long time without removal of the collected cake or dust from the filter surface. That is, the time of one cycle of filtering operation which can be continued without the removal of the collected cake is very long.
3. The useful life of the fabric filter is longer than that of conventional fabric filters.
4. The flow rate of a fluid (liquid or gas) containing solid particles at which the fluid can be treated by the fabric filter is larger than that when a conventional fabric filter is used.
5. The filtering machine in which the fabric filter is used, can be made smaller than a filtering machine in which a conventional fabric filter is used.
6. Since the softness of the fabric filter is substantially the same as that of the original fabric from which the fabric filter is produced, in the case of a fabric filter for a dry dust collecter, the collected dust can be easily removed from the fabric filter by a mechanical operation, for example, vibration, which can be effected utilizing a low energy source.
7. By properly designing the structure of the fabric filter, taking into account the size of solid particles to be filtered, it is possible to increase the collecting efficiency of the fabric filter.
8. The maintenance of the fabric filter is simple and easy to perform.

After the network formation is completed, it is preferable that the resultant fabric filter has an air permeability of from 2 to 40 $ml/cm^2/sec$, determined in accordance with ASTM D 737-69. If the air permeability is less than 2 $ml/cm^2/sec$, the fabric filter sometimes may have a high pressure drop during the filtering operation. Also, an air permeability layer greater than 40 $ml/cm^2/sec$ sometimes may cause the fabric filter to have a very poor collection efficiency.

In order to easily remove the collected cake from the surface of the fibril layer, it is preferable that the number of the fibrils which project at a length of 1 mm or more from the surface of the fibril layer is 20 or less per 100 $cm^2$ of the surface.

In order to fasten the networks formed on the fibril layer, it is preferable to calender the fabric filter. For this purpose, any type of conventional calenders, for example, roller calender, frictional calender, and embossing calender, can be utilized. The calendering operation may be carried out under a pressure of at least 1 kg/cm². Also, the calendering operation may be effected at a glass-transition temperature of the thermoplastic polymer fibrils or higher, preferably, at a temperature of $0.8\ T_m$ or higher, in which $T_m$ represents the melting point of the thermoplastic polymer fibrils in Kelvin temperature units, but lower than the melting point of the thermoplastic polymer fibrils. The temperature and pressure in the calendering operation are variable depending upon the structure and weight of the fabric filter used, type and thickness of yarns and conditions of the fibril layer in the fabric filter used, and size and shape of the solid particles to be filtered. However, it is preferable that the air permeability of the calendered fabric filter be in a range of from 2 to 20 ml/cm²/sec.

Figure 2:
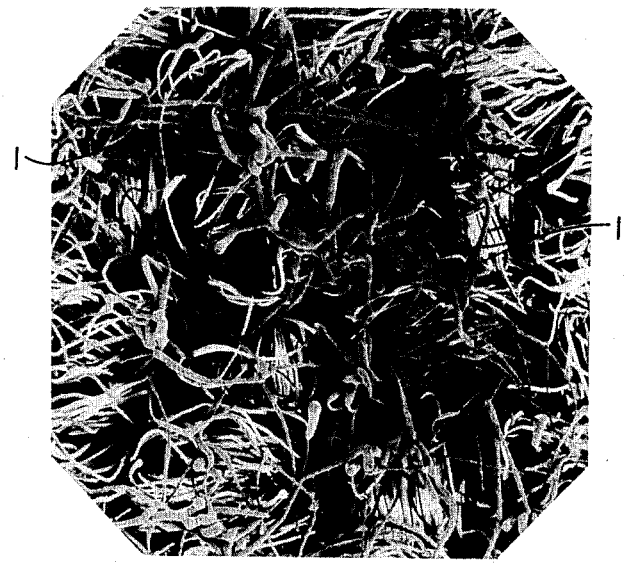
FIG. 2 is a scanning type electron microscopic view, in a magnification of 40, of a surface of a fabric filter which has been provided from the woven fabric shown in FIG. 1 by raising the woven fabric and bringing the raised fibril layer of the woven fabric into contact with flames.
Figure 3:
FIG. 3 is a scanning type electron microscopic view, in a magnification of 40, of a fabric filter which has been prepared by calendering the fabric filter shown in FIG. 2.

Referring to FIG. 3, when the fabric filter of the present invention as shown in FIG. 2 is calendered, the fuse-bonded fibrils are squashed so as to form flat surface 2 thereon. Accordingly, the calendering operation applied to the fabric filter having the networks of the fuse-bonded fibrils, is effective to increase the smoothness of the surface of the fibril layer. For example, when a fabric filter of the present invention, which has been calendered, is used for a filtration of gases, the cleanability of the collected dry dust therefrom by mechanical vibration is similar to or a little higher than that of the conventional filament fabric filter having a very smooth surface. The high smoothness of the calendered fabric filter results in a decrease in pressure drop during the filtering operation and in an increase in the collecting efficiency. The fabric filter of the present invention is very effectively used for gas filtration, for example, industrial bag filters, electric cleaners and air cleaners. Also, the fabric filter of the present invention can be utilized for the filtration of liquid.

Examples 1 and 2 and
Comparison Examples 1 through 5

In each of the Examples 1 and 2, a fine-harness satin, which has been produced from two-folded warp and weft yarns each composed of a spun yarn having a cotton count of 20 and consisting of polyethylene terephthalate staple fibers having a denier of 1.5 and a length of 51 mm, was used. The fine-harness satin fabric had a warp yarn density of 73 yarns/25.4 mm and a weft yarn density of 58 yarns/25.4 mm. One surface of the satin fabric was raised with a card wire raising machine to form a fibril layer.

In Example 1, the raised satin fabric was subjected to a gas singeing machine at a speed of 80 m/min in such a manner that the fibril layer was brought into contact with flames which had been generated by burning a gas fuel in the singeing machine. In Example 2, the raised fabric was subjected to the gas singeing machine at a speed of 150 m/min in the same manner as that mentioned in Example 1. The fabric filters of the Examples 1 and 2 had networks of the fuse-bonded polyethylene terephthalate fibrils. Each of the fabrics prepared in Examples 1 and 2 was sewed to form a cylinder-shaped bag filter having a diameter of 16 cm and a length of 90 cm. The bag filter was placed in a filter simulator machine and filtered, at a constant inlet speed of 10 g/min, a suspension containing, at a concentration of 22 g/m³, silica particles, having a median diameter of 1.3 microns and a distribution constant of Rosin-Rammler's formula of 1.0, so as to collect the silica particles on the inside surface of the cylinder-shaped bag filter. The silica particle-containing air was filtered at an apparent face velocity of 1.2 m/min. The aerial dust loading-pressure drop property was recorded on a time-based recorder and collection efficiency of the fabric filter was measured. When the pressure drop reached 150 mm of water, the filtering operation was stopped, and the top end of the bag filter was mechanically shaken horizontally, at an amplitude of 2 cm and a frequency of 5 Hz, for one minute. The cleanability of the filter for the collected silica particles was determined by the following equation:

$$\text{Cleanability (\%)} = \frac{W_1}{W_0}$$

wherein $W_0$ represent the entire weight of the silica particles collected by the bag filter and $W_1$ represent the weight of the silica particles removed from the bag filter by cleaning. The cycle consisting of the above-mentioned filtering operation and cleaning operation was repeated 50 times. The pressure drop in an n-th cycle of filtering operation was represented by a filtration period $T_n$, which refers to a period of time from the start of the n-th cycle of filtering operation to a stage at which the pressure drop of the fabric filter reaches 150 mm of water and the filtering operation is ended. The longer the filtration period, the lower the pressure drop. The collection efficiency of the fabric filter was represented by a penetration index, which refers to a ratio of the weight of the silica particles which have passed through the fabric filter to the entire weight of the silica particles contained in the filtered suspension. The lower the penetration index, the higher the collection efficiency.

After the fiftieth cycle of the filtering and cleaning operations was finished, the residual dust loading of the fabric filter was measured, which refers to an amount in g/m² of the dust remaining in the fabric filter. The larger the residual dust loading, the lower the cleanability of the fabric filter.

In Comparison Example 1, the same filtering test as mentioned in Example 1 was carried out using a fine-harness satin fabric filter. The fabric was composed of two-fold warp and weft yarns each consisting of two polyethylene terephthalate multifilament yarns of 250 deniers/48 filaments. The fabric had a warp density of 73 yarns/25.4 mm and a weft density of 58 yarns/25.4 mm.

In Comparison Example 2, the same filtering test as that used in Example 1 was applied to a satin fabric which was the same as that used in Example 1. The satin fabric was not raised and not subjected to the singeing machine.

In Comparison Example 3, the same filtering test as that in Example 1 was carried out by using a satin fabric which was the same as that used in Example 1, except that the satin fabric was raised but not subjected to the fuse-bonding operation.

In Comparison Example 4, the same filtering test as that mentioned in Example 1 was carried out, except that a needle-punched non-woven fabric consisting of polyethylene terephthalate staple fibers of 1.5 denier and having a weight of 400 g/m² was used as a fabric filter.

In Comparison Example 5, the same procedures as those described in Comparison Example 4 were carried out, except that the non-woven fabric had been subjected to a gas singeing machine at a speed of 80 m/min so that the surface of the non-woven fabric was in contact with flames of the singeing machine.

The results of Examples 1 and 2 and Comparison Examples 1 to 5 are shown in Table 1.

filters. Accordingly, by using the fabric filter of the present invention, it is possible to decrease the cleaning operations necessary for a predetermined time of filtration. Also, when the dust removal operations are conducted at predetermined time intervals, it is possible to Table 1

| | | | | | Filter Performance | | | | |
|---|---|---|---|---|---|---|---|---|---|
| | | | | | | 1st cycle | | 50th cycle | |
| Example No. | Fabric | processing Raising | Fuse-bonding | Air permeability (ml/cm²/sec) | Filtration period, T₁ (min) | Cleanability (%) | Filtration period, T₅₀ (min) | Penetration index (×10⁻⁴) | Residual dust loading (g/m²) |
| Comparison Example 1 | Filament yarn woven fabric | no | no | 13.5 | 8.4 | 92 | 5.2 | 41.7 | 81 |
| Comparison Example 2 | Spun yarn woven fabric | no | no | 10.0 | 15.7 | 69 | 10.5 | 4.2 | 231 |
| Comparison Example 3 | Spun yarn woven fabric | yes | no | 6.3 | 30.0 | 42 | 8.3 | 0.5 | 450 |
| Example 1 | Spun yarn woven fabric | yes | yes at 80 m/min | 7.2 | 31.3 | 81 | 24.5 | 0.7 | 280 |
| Example 2 | Spun yarn woven fabric | yes | yes at 150 m/min | 6.5 | 31.7 | 83 | 20.9 | 0.4 | 316 |
| Comparison Example 4 | Non-woven fabric | no | no | 22.6 | 40.5 | 40 | 9.3 | 19.0 | 615 |
| Comparison Example 5 | Non-woven fabric | yes | yes at 80 m/min | 26.0 | 32.5 | 28 | 9.1 | 17.6 | 720 |

Table 1 shows the following properties of the fabric filters tested.

1. The filament yarn woven fabric of Comparison Example 1 has a very short filtration period and very low collection efficiency in both the first and fiftieth cycles.

2. The spun yarn woven fabric of Comparison Example 2 had a short filtration period in the first and fiftieth cycles.

3. The raised spun yarn woven fabric of Comparison Example 3 had a long filtration period in the first cycle. However, this fabric had a shortened filtration period in the fiftieth cycle. That is, by using the spun yarn woven fabric as a fabric filter for a long period of time, the filtering performance of the fabric was deteriorated.

4. The fabric filters of Examples 1 and 2, which were prepared in accordance with the present invention, had a long filtration period in the first and fiftieth cycles and a high collection efficiency in the fiftieth cycle, which was similar to that of Comparison Example 3. 5. The non-woven fabrics of Comparison Examples 4 and 5 had a short filtration period in the fiftieth cycle. That is, the filtering performance of the non-woven fabrics deteriorated during the filtering cycles.

It should be noted that the filtration period of the fabric filters of Examples 1 and 2 in the fiftieth cycle is about 2 to 4.5 times that of the conventional fabric filter the suspension with the fabric filter of the present invention at a relatively large flow rate.

Example 4 and Comparison Examples 6 and 7

Procedures identical to those conducted in Example 1 were carried out, except that the fabric filter was made of a fine-harness satin fabric which was composed of two-folded warp and weft yarns having a meter count of 20 and each consisting of 1.5 denier polyethylene terephthalate staple fibers, which had a warp density of 73 yarns/25.4 mm and 48 yarns/25.4 mm, and which had been calendered between a hot metal roller having a temperature of 170° C. and a paper roller at a pressure of 5 kg/cm² after the satin fabric had been raised and subjected to the fuse-bonding process in accordance with the same methods as conducted in Example 1.

In Comparison Example 6, the same procedures as those conducted in Example 4 were carried out, except that the satin fabric was not raised, fuse-bonded and calendered.

In Comparison Example 7, the same procedures as those conducted in Example 4 were carried out, except that the satin fabric was raised but, thereafter, not fuse-bonded and calendered.

The results of Example 4 and Comparison Examples 6 and 7 are shown in Table 2.

Table 2

| | | | | | Filter Performance | | | | | |
|---|---|---|---|---|---|---|---|---|---|---|
| | | | | | 1st Cycle | | 50th Cycle | | | |
| Example No. | Processing Raising | Fuse-bonding | Calendering | Air permeability ml/cm²/sec | Filtration period, T₁ (min) | Cleanability (%) | Filtration period, T₅₀ (min) | Penetration index (×10⁻⁴) | Residual dust loading (g/m²) | T₅₀/T₁ |
| Comparison Example 6 | no | no | no | 15.2 | 15.7 | 69 | 10.5 | 16.5 | 208 | 0.67 |
| Comparison Example 7 | yes | no | no | 18.6 | 30.0 | 42 | 8.3 | 1.3 | 390 | 0.28 |
| Comparison Example 4 | yes | yes | yes | 6.1 | 22.7 | 92 | 20.9 | 0.3 | 73 | 0.92 |

Table 2 shows that the fabric filter of Example 4 has a smaller pressure drop and higher collecting efficiency and dust removal efficiency than those of the fabric filter of Comparison Example 6. The collecting time of the fabric filter of Example 4 in the first cycle is similar to that in the fiftieth cycle. However, the filtration period of the fabric filter of Comparison Example 7 in the fiftieth cycle is remarkably smaller than that in the first cycle.

What we claim is:

1. In a fabric filter comprising a woven or knitted fabric which comprises thermoplastic polymer fibers having a fibril layer which has been formed by raising a surface of said fabric and which is composed essentially of the thermoplastic polymer fibers, the improvement comprising a portion of said fibrils in said fibril layer being fuse-bonded to each other to form networks of said fuse-bonded fibrils on the surface of said fibril layer.

2. A fabric filter as claimed in claim 1, wherein said fabric filter has an air permeability of from 2 to 40 ml/cm$^2$/sec determined in accordance with ASTM D 737-69.

3. A fabric filter as claimed in claim 2, wherein said air permeability of said fabric filter is in the range of from 2 to 20 ml/cm$^2$/sec.

4. A fabric filter as claimed in claim 2, wherein up to 20 fibrils per 100 cm$^2$ of the surface of said fabric filters project at a length of 1 mm or more from said surface.

5. A fabric filter as claimed in claim 1, wherein said woven fabric is a satin or twill fabric.

6. A fabric filter as claimed in claim 1, wherein said thermoplastic polymer fibers consist of a polyester, aliphatic polyamide, polyolefin, aromatic polyamide, polyvinyl chloride or polyvinylidene chloride.

7. A fabric filter as claimed in claim 1, wherein said fibril layer contains at least 10 nodes consisting of two or more fuse-bonded fibrils per cm$^2$ of said fibril layer surface.

8. A fabric filter as claimed in claim 7, wherein said fibril layer contains at least 50 nodes consisting of 2 or more fuse-bonded fibrils per cm$^2$ of said fibril layer surface.

9. A process for producing a fabric filter, comprising raising a woven or knitted fabric which comprises thermoplastic polymer fibers, to form a fibril layer composed essentially of the thermoplastic polymer fibers on a surface of said fabric, contacting said fibril layer with a heating medium having a temperature higher than the melting point of said thermoplastic polymer fibers to fuse-bond a portion of said fibrils to each other and to form networks of said fuse-bonded fibrils on the surface of said fibril layer.

10. A process as claimed in claim 9, wherein said fibril layer is brought into contact with flames which have been generated by burning a fuel.

11. A process as claimed in claim 1, wherein after said fibril layer is brought into contact with the heating medium, said fabric is calendered under a pressure higher than 1 kg/cm$^2$.

12. A process as claimed in claim 11, wherein said calendering operation is carried out at the glass transition temperature of said thermoplastic polymer fibrils or higher, but lower than the melting point of the thermoplastic polymer fibrils.

* * * * *